Figure 1:
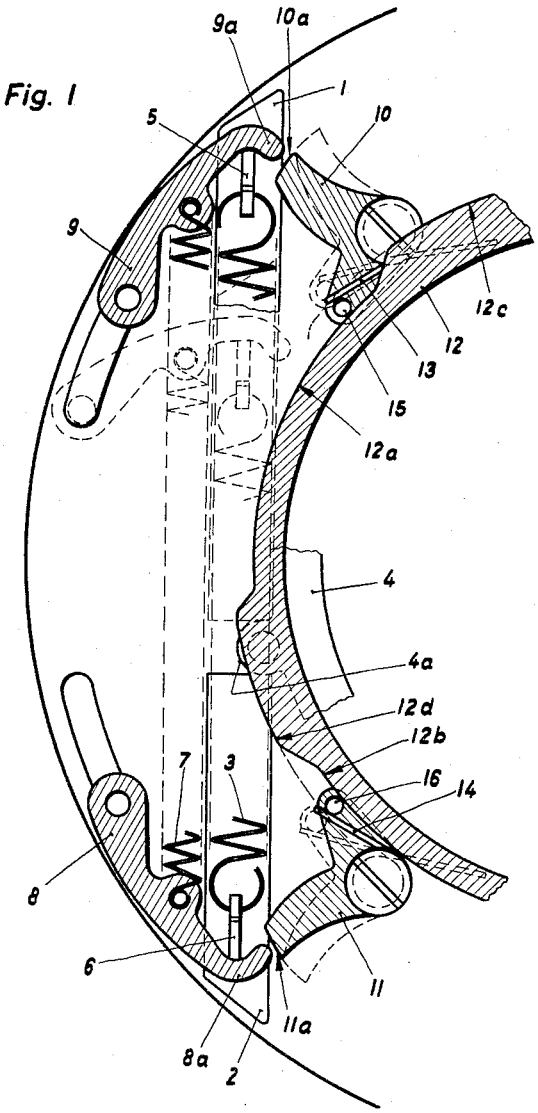

INVENTORS.
H. Junghans
K. von Zeppelin
Rudolph Weber
BY
Gustav H. Imey
Atty.

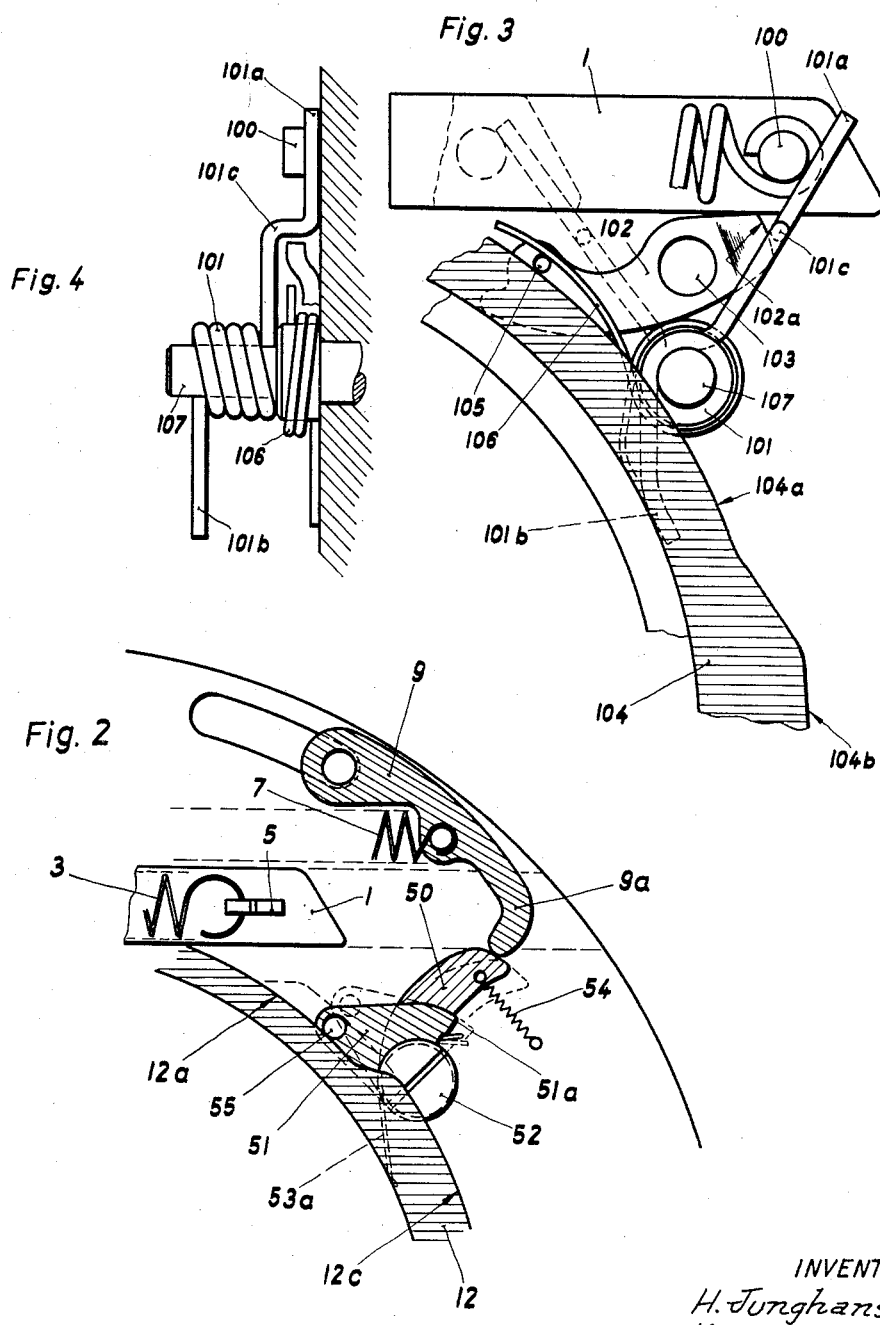

United States Patent Office 2,925,024
Patented Feb. 16, 1960

2,925,024

CENTERING SHUTTER FOR PHOTOGRAPHIC CAMERAS

Helmut Junghans, Schramberg-Sulgen, and Kurt Von Zeppelin and Rudolf Weber, Schramberg, Germany Application December 11, 1953, Serial No. 397,686

Claims priority, application Germany December 11, 1952

2 Claims. (Cl. 95—63)

The invention relates to centering shutters for photographic cameras which are equipped with at least one energy storage unit which can be engaged at will. The invention refers particularly to an improvement and development of the centering shutter for photographic cameras as for example described in British Patent No. 748,394 of May 2, 1956, which corresponds to our U.S. application S.N. 279,396 filed March 29, 1952, now Patent No. 2,891,456, and which comes under the type of shutter having double blades which open and close in the same reversal direction of rotation after each exposure and are coupled with a common drive element cooperating with a release device. The important feature of the shutter according to the said previous application and British patent is the arrangement of a bilaterally acting energy storage unit capable of being coupled alternately with the blade drive member for direct transmission of power in opposite directions and also the arrangement of a single tension member for the energy storage and means for alternately disengaging and simultaneously tensioning the half of the energy storage which is not participating in the drive, from acting on the blade drive member.

Our said previous application and British patent also contain suggestions for the arrangement of additional springs bilaterally engageable in the tensioning path of the main spring. These additional springs are mounted on stops which can be moved into operative and inoperative position by means of the shutter setting member. This arrangement is open to the objection that, in changing the setting of the shutter from an exposure time when the additional springs do not participate, to that when they assist in the shutter drive, the additional springs must be tensioned through the intermediary of the shutter setting member; this means that the shutter setting member must be subjected to an extremely heavy pressure.

The object of the invention is to overcome this objection. To attain this object the additional springs are tensioned simultaneously with the main spring and the shutter setting member merely determines the cooperation of the two springs during the shutter drive.

This arrangement presents the advantage that the additional springs are tensioned with the main spring, with the result that the additional energy required does not inconvenience the user and the shutter setting member is relieved of the spring forces of the additional springs.

Several embodiments of the invention are hereinafter described by way of example in the following specification with reference to the accompanying drawings. These embodiments are shown on a considerably enlarged scale and those parts of the shutter which are not necessary for the understanding of the invention are omitted.

Figure 5:
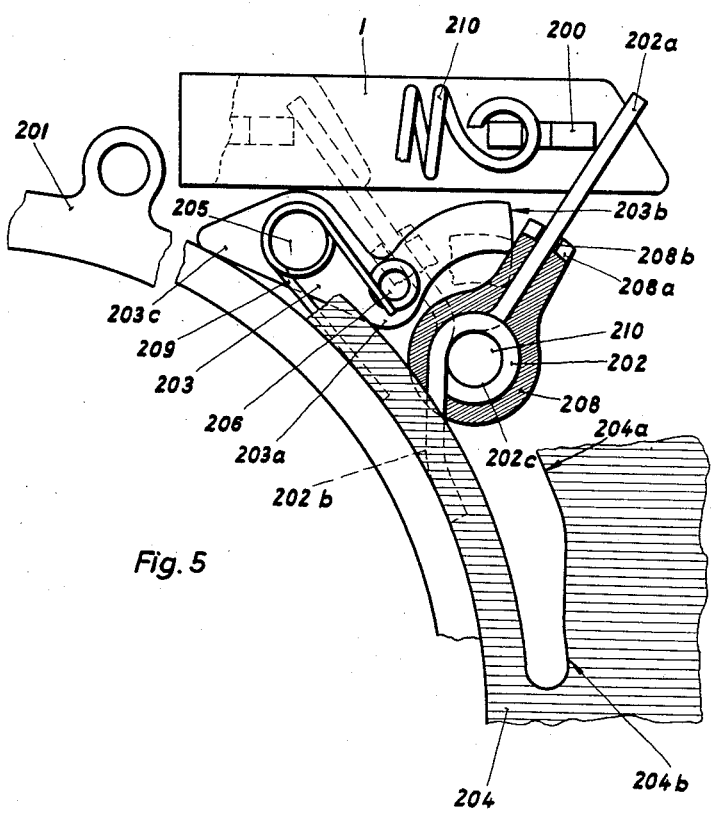

In the drawings:

Fig. 1 shows the first form of construction with a single additional spring the two tensioned ends of which become alternately operative, Fig. 2 is a modification of the construction shown in Fig. 1, Figs. 3 and 4 show a second form of construction with separately operating additional springs, and Fig. 5 shows a third form of construction.

It is taken for granted that, as set forth in our prior application and British patent, a ring 4 serves as driving element for the double blades not shown in the drawing, this ring being hereinafter referred to as the blade drive ring. The ring 4 has a driving lug 4a on the opposite sides of which slides 1 and 2, running in guides in the shutter housing, act. The main drive spring 3 which is a helical spring, is hooked into the slides 1 and 2 at the points 5 and 6 respectively. The means for tensioning the main drive spring are not shown in the drawing, it will suffice to recall the fact that whether the shutter is under tension or not, one slide is always in tensioning position and remains there up to the end of an exposure, so that the other slide can move forward unimpeded; the second slide in moving forward pushes the drive lug 4a in front of the end face of the slide which is in tensioning position, so that at the next exposure this can in its turn move forward when the slide which has just moved forward has been brought back into its tensioning position once more.

In the first form of construction (Fig. 1) a helical spring 7 is used as additional spring, its ends becoming alternately operative like those of the main drive spring 3. The ends of the spring 7 are hooked into levers 8 and 9 respectively. When the main drive spring 3 is tensioned by the tensioning lever not shown in the drawing, the ends of the spring 7 are also tensioned. For this purpose the levers 8 and 9 are provided with arms 8a and 9a respectively. These levers are therefore extended beyond the spring engagement point and bear against the lugs 5 and 6 on the slides 1 and 2. When the slide 1 or 2 is actuated by the tensioning lever and the main spring 3 is tensioned, the additional spring 7 is also tensioned because the lug 5 or 6 pushes the lever 8 or 9 along with it. In Fig. 1 the levers 8 and 9 are shown in tensioned position. The springs 3 and 7 are therefore tensioned all ready for the shutter to function. If exposures with shutter times of 1 second to 1/500 of a second are made, the levers 8 and 9 remain in their tensioned position as they are blocked by the levers 10 and 11 respectively. When one end of the main spring 3 is released with its slide 1 or 2 and consequently is no longer under tension, the additional spring can not retract because the noses 8a and 9a of the levers 8 and 9 bear against the faces 10a and 11a respectively of the levers 10 and 11.

The additional spring 7 therefore remains permanently tensioned and does not require to be again tensioned if exposures are made which come within the timing range of 1 second to 1/500 of a second. Only when exposures of 1/1000 or 1/1200 of a second are made does the lever 8 or 9 swing, thereby allowing the corresponding end of the spring 7 to relax or retract. In the case of 1/1000 of a second the levers 10 and 11 must be brought into the unlocked position, shown in dash lines in the drawing. The locking and releasing positions of the levers 10 and 11 are controlled by the setting ring 12. For this purpose the setting ring 12 has a low guide track 12a, 12b and a high guide track 12c, 12d. To ensure that the levers 10 and 11 bear against the guide tracks small springs 13 and 14 are provided. Each of these springs bears against a pin 15 or 16 and presses its respective lever lightly against the guide track. The blocked position shown in Fig. 1 corresponds to settings for exposure time of 1/500 of a second, whereas the position shown in dash lines with the levers 10 or 11 in release position corresponds for timing of 1/1000 or 1/1200 of a second.

If now, for example, an exposure of 1/1000 of a second is to be made and the shutter is not tensioned (the setting is usually carried out before the tensioning) the lever 8 or 9 will retract during the setting operation because when it is not under tension it is not held by the blocks 5 and 6 but only by the levers 10 and 11. As the locking lever, for example the lever 10, is brought on to the higher guide track 12c during the setting for an exposure time of 1/1000 of a second, the lever 9 can retract into the position shown in dash lines. The block 5 during this procedure was already in the position shown in dash lines. The retraction of the lever 9 presents no particular disadvantages, the noise of the dropping of the lever 9 can only be heard when the setting ring 12 is brought into the position for an exposure of 1/1000 of a second.

To eliminate the above mentioned noise caused by the shifting of the lever which has no functional disadvantage, a modified form of construction is proposed (Fig. 2).

In this construction the levers 8 and 9 are similar to those used in the first form of construction. The same applies to the additional spring 7. The setting ring 12, slides 1 and 2, blocks 5 and 6 and the main drive spring 3 are also the same. The locking of, for example, the lever 9 is effected by a lever 50 and coordinated to this lever is a second lever 51. Both these levers have the same turning point and are mounted on a shoulder screw 52. A leg spring 53, mounted under the head of the screw 52, presses the lever 51 lightly against the track of the guide way on the setting disk or ring 12. A pull-back spring 54 maintains the lever 50 in light contact with the abutment or bent-over lug 51a of the lever 51. This lug 51a serves at the same time as abutment for the end of the leg spring 53. The spring 54 must be weaker than the spring 53 to ensure that the stud 55 is maintained in contact with the guide track of the setting ring 12.

In Fig. 2 the levers 50 and 51 are in locking position. This corresponds to settings for exposures between 1 second and 1/500 of a second. When the levers 50, 51 are in the position shown in dash lines they are in their released position which corresponds to settings for exposures for 1/1000 of a second. (The stud 55 is then on the raised guide track 12c of the setting ring 12.)

In this form of construction therefore, if the setting ring is turned from 1/500 to 1/1000 of a second, providing the main drive spring 3 is not yet tensioned, the lever 50, under the pressure exerted by the nose 9a of the lever 9, remains in locked position, that is in the position shown in Fig. 2. Only when the shutter tensioning lever is under tension and the slide 1 with the block 5 is in its extreme tensioning position lifting the nose 9a of the lever 9 slightly, can the lever 50 leave the locking position under the action of the spring 54 and assume the released position shown in dash lines. This retarded movement of the lever 50 under the action of the very weak spring 54 takes place almost silently. Consequently the two-part lever avoids snapping noises when changing over the setting and the person using the shutter might assume that something is not in order or a lever has shifted too soon.

The spring 54 may also be constructed as a leg-spring and mounted on the pivot 52 and inversely the spring 53 may be a pull-back spring. The leg 53a of the spring 53 bears against a rigid abutment, preferably the edge of the shutter housing. The same applies to the springs 13 and 14 mentioned in connection with Fig. 1.

*Form of construction illustrated in Figs. 3 and 4*

In this construction separate additional springs are provided. They are, however, brought into their tensioned position also by the shutter tensioning lever. The leg 101a of the spring 101 bears against the slide 1 or its block 100 carrying one end of the main spring. It is also mentioned that the arrangement coordinated to slide 2 is similar but not shown in the drawing. The other leg 101b of the additional spring 101 bears against a rigid abutment, preferably the wall of the housing.

The offset knee 101c formed in the leg 101a of the spring 101 is blocked by an abutment face 102a of the lever 102 mounted on a rivet or bolt 103. In Fig. 3 the lever 102 is shown in blocking position, that is in the position in which the setting ring 104 is adjusted for exposure times ranging from 1 second to 1/500 of a second. In this instance the pin 105 of the lever 102 bears lightly against the guide track of the setting ring 104 under the gentle pressure exerted by the spring 106. The spring 106 is mounted on the stud 107 which carries the additional spring 101. If the pin is lifted from the lower guide path or track 104a on to the higher guide track 104b the locking lever 102 is in its releasing position. This position is shown in dash lines in Fig. 3. In this figure the additional spring 101 or the end or leg 101a thereof is shown in dash lines in relaxed state, that is in the position it assumes after the slide 1 has retracted at the end of the releasing operation.

The leg spring 106 might also be mounted on the pivot 103 carrying the lever 102.

In this form of construction the late noise described in connection with Fig. 1 also occurs, if the setting ring 104 is turned before the shutter is tensioned. In this case, however, a bipartite lever might also be provided in the manner described in connection with Fig. 2.

*Form of construction illustrated in Fig. 5*

In this form of construction the main drive slide is again designated by 1 and carries an eye lug 200 into which one end of the main spring 210 is hooked. The blade drive ring is designated by 201. The principle on which the additional spring 202 functions is the same as that in the form of construction illustrated in Fig. 3. The blocking lever 203 is guided by an outer guide track on the setting ring 204 and as a result the blocking lever 203 is differently mounted. Its pivot pin is designated by 205 and the abutment face 203b is located on the end of an extension of an arm 203a carrying the guide or abutment pin 206. Furthermore the additional spring is not supported directly as in the construction illustrated in Fig. 3, but this spring 202 engages a slot 208b in a lug 208a formed on the end of the lever 208. This bent-over lug 208a serves at the same time as abutment acting in conjunction with the abutment face 203b of the lever 203.

Fig. 5 shows the lever 203 in blocking position, the setting ring 204 being in the position covering the setting range from 1 second to 1/500 of a second. The arm 203c when in this position bears against the wall of the housing or against some other stationary part. The construction might be such that the pin 206 bears against the guide track 204a. In the first case the advantage would be derived that no additional friction occurs on the guide track 204a in the setting range between 1 second and 1/500 of a second. The guide track 204a is shown broken away in Fig. 5. It is necessary to imagine this radial guide track in extension, that is when setting for shutter timings between 1 second and 1/500 of a second, it must be within the range of the pin 206. If the setting disk 204 is set for 1/1000 of a second, the lever 203 will be pressed downwards with the pin 206 sliding along the guide track 204b and in this case the lever 203 will assume the position shown in dash lines in Fig. 5. This position represents the release position.

The leg-spring 209 which is also mounted on the pivot pin 205 exerts a light pressure on the lever 203 in counterclockwise direction so that in the locking position the arm 203c bears against the wall of the housing and in the release position the pin 206 bears against the guide track 204b. The leg 203a of the spring 209 bears against the lug 200 and is shown in relaxed position in dash lines in Fig. 5. The cooperation between the leg spring and the main drive spring 210 is in other respects similar to that in the forms of construction previously described above.

We claim:

1. A centering shutter for photographic cameras comprising a shutter housing, shutter blades, a main driving spring to drive the shutter blades, an auxiliary driving spring to aid the main driving spring, a shutter tensioning member, a shutter setting member, means on the shutter tensioning member to tension the main drive spring and the said auxiliary driving spring, means connected to the said shutter setting member to operate the two springs together or operate the springs separately upon the operation of the shutter blades, a counter member mounted in the shutter housing and having a counter bearing surface to take up the force of the auxiliary spring, a control surface on the counter bearing, a control cam on the shutter setting member operative together with the control surface on the counter surface whereby the control cam is so formed that a setting for a rapid shutter speed will be held in its inoperative position so that upon low shutter speeds it can be set with its counter bearing surface preventing the tensioning of the auxiliary spring.

2. A centering shutter according to claim 1, in which the levers are swingingly mounted so that they may swing out of the way during the tensioning of the additional spring.

References Cited in the file of this patent

UNITED STATES PATENTS

| | | |
|---|---|---|
| 961,192 | Wollensak | June 14, 1910 |
| 1,166,921 | McPhee | Jan. 4, 1916 |
| 1,214,250 | Wollensak | Jan. 30, 1917 |
| 1,325,317 | Fairchild | Dec. 16, 1919 |
| 1,963,324 | Deckel et al. | June 19, 1934 |